United States Patent
Clar et al.

(10) Patent No.: US 7,352,791 B2
(45) Date of Patent: Apr. 1, 2008

(54) OPTICAL SYSTEMS INCLUDING WAVEFRONT CORRECTING OPTICAL SURFACES

(75) Inventors: Colleen R Clar, Victor, NY (US); Horst Schreiber, Rochester, NY (US)

(73) Assignee: Corning Incorporated, Corning, NY (US)

(*) Notice: Subject to any disclaimer, the term of this patent is extended or adjusted under 35 U.S.C. 154(b) by 238 days.

(21) Appl. No.: 11/122,933

(22) Filed: May 4, 2005

(65) Prior Publication Data

US 2006/0023277 A1 Feb. 2, 2006

(51) Int. Cl.
*H01S 3/08* (2006.01)

(52) U.S. Cl. .................. 372/100; 372/98; 372/99; 372/107; 372/108; 359/640; 359/641

(58) Field of Classification Search .............. 372/99, 372/100; 359/640, 641
See application file for complete search history.

(56) References Cited

U.S. PATENT DOCUMENTS

| | | | |
|---|---|---|---|
| 5,559,816 A | 9/1996 | Basting et al. | 372/27 |
| 5,970,082 A | 10/1999 | Ershov et al. | 372/102 |
| 6,236,490 B1* | 5/2001 | Shen | 359/247 |
| 6,404,796 B1 | 6/2002 | Albrecht et al. | 372/52 |
| 6,424,666 B1* | 7/2002 | Stamm | 372/32 |
| 6,493,374 B1 | 12/2002 | Fomenkov et al. | 372/102 |
| 6,671,294 B2 | 12/2003 | Kroyan et al. | 372/20 |
| 6,693,745 B1* | 2/2004 | Kondis et al. | 359/569 |
| 7,283,204 B2* | 10/2007 | Wegmann | 355/67 |

* cited by examiner

*Primary Examiner*—Minsun Oh Harvey
*Assistant Examiner*—Yuanda Zhang
(74) *Attorney, Agent, or Firm*—Timothy M. Schaeberle

(57) ABSTRACT

The present invention relates to optical systems, beam expanding assemblies, line narrowing modules, and lasers having refractive optical elements with wavefront correcting optical surfaces. The present invention enables the skilled artisan to provide optical systems, beam expanding assemblies, line narrowing modules, and lasers having improved optical properties, such as, in the case of lasers, narrow linewidth at high power, and substantially planar wavefronts.

7 Claims, 4 Drawing Sheets

OPTICAL SYSTEMS INCLUDING WAVEFRONT CORRECTING OPTICAL SURFACES

BACKGROUND OF THE INVENTION

1. Field of the Invention

The present invention relates generally to optical systems, and more particularly to beam expanding assemblies, line narrowing modules, lasers, and other optical systems having desirable beam wavefront characteristics.

2. Technical Background

For many applications, optical systems that provide beams of radiation having specified wavefront properties are highly desired. For example, in the UV photolithography processes used to make semiconductor devices such as computer chips, a substantially planar wavefront is highly desirable in order reduce interferometric effects and to achieve the best possible photolithographic performance. Further, the performace of the UV lasers used in these photolithographic processes is dependent on the wavefront characteristics of the beam propagating inside the laser, which are in turn dependent on the optical elements of the laser. The optical elements of the laser are generally not ideal, due, for example, to manufacturing and material limitations. The wavefront characteristics of the beam have a strong effect on the properties of the laser output. For example, the linewidth and center wavelength of the laser can be negatively affected when the beam propagating inside the laser has a change in wavefront profile. Further, the linewidth and center wavelength of the laser can change as the laser warms up from the time it is turned on to the time it reaches thermal equilibrium. This thermal drift can be especially problematic in high power UV lasers, which use $CaF_2$ optical elements. While $CaF_2$ has a highly desirable transparency for use with radiation below 300 nm, it has a relatively high coefficient of thermal expansion (about 18.9 ppm/K at room temperature).

In order to improve the optical performance of UV lasers, one current approach is to insert adaptive optics or bendable gratings into the line narrowing module conventionally used to narrow the natural linewidth of the laser. While this approach can be effective, such actively adjustable elements can be very expensive, require complicated driving mechanisms, and can be difficult to combine with the rest of the stringently engineered laser architecture. Further, such actively adjustable elements can tend to increase the risk of failure and instability, and may not be able to sufficiently correct static and dynamic wavefront errors in the laser.

SUMMARY OF THE INVENTION

One aspect of the present invention relates to a beam expanding assembly for expanding a beam, the beam expanding assembly having an input, an output and a beam path, the beam expanding assembly including a set of one or more prisms configured to expand the beam propagating from the input along the beam path to the output, wherein at least one of the one or more prisms has a wavefront correcting optical surface which is substantially non-planar when the line narrowing module is in a cold state.

Another aspect of the present invention relates to a laser having an internal beam path and a laser beam output, the laser including a resonator and at least one refractive optical element disposed in the beam path, wherein the refractive optical element has a wavefront correcting optical surface.

Another aspect of the present invention relates to an optical system having a beam path and an output, the optical system including a source of radiation; and a set of one or more refractive optical elements, the set including at least one non-planar surface, the set of refractive optical elements being selected to give the radiation a substantially planar wavefront at a location along the beam path.

Another aspect of the present invention relates to method of making an optical system including the steps of selecting a plurality of optical elements for the optical system; selecting a configuration for the optical system; determining the performance of the optical system comprising the selected optical elements in the selected configuration; ensuring that at least one of the optical elements is a refractive optical element having a wavefront correcting optical surface adapted to improve the performance of the optical system; and assembling the optical elements into the optical system having the selected configuration.

The optical systems and methods of making optical systems of the present invention result in a number of advantages over conventional optical systems and methods. For example, the optical systems of the present invention can have improved performance, and can be adapted to provide a desired wavefront profile. Both static wavefront errors (caused by imperfections in the optical components of the system as made), and dynamic wavefront errors (caused by the hot state distortion of the optical components from their as-made geometries) can be minimized, not only for particular optical elements, but also for the system as a whole. The optical systems of the present invention can be made without actively adjustable elements such as adaptive optics or bendable gratings, and can therefore have relatively high stability and low cost. Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale. The drawings illustrate one or more embodiment(s) of the invention, and together with the description serve to explain the principles and operation of the invention.

DETAILED DESCRIPTION OF THE INVENTION

Figure 1:
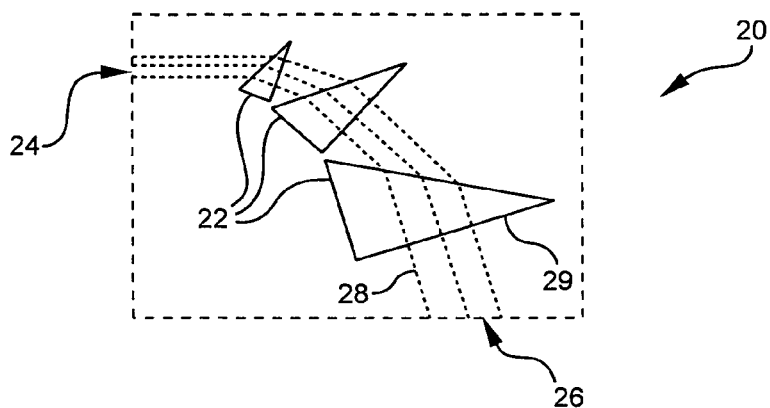
FIG. 1 is a schematic view of a beam expanding assembly according to one embodiment of the present invention.

One embodiment of the present invention is shown in schematic view in FIG. 1. A beam expanding assembly 20 has a set of one or more prisms 22, an input 24, an output 26 and beam path 28. The set of one or more prisms is configured to expand a beam propagating from input 24 along the beam path 28 to output 26. At least one of the set of prisms has a wavefront correcting optical surface 29 which is substantially non-planar when the line-narrowing module is in a cold state. As used herein, an optical surface is a prism surface through which a beam is transmitted along the beam path. A wavefront correcting optical surface may be formed on only one of the optical surfaces of one of the prisms, or wavefront correcting optical surfaces may be formed on multiple optical surfaces of the set of prisms.

Figure 2:
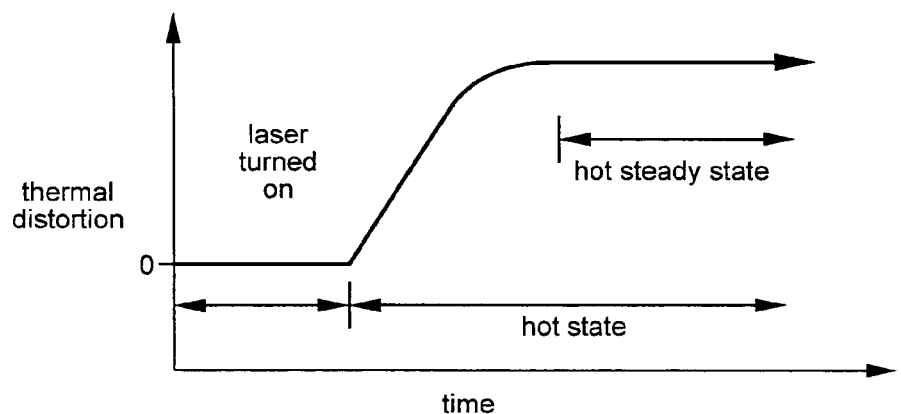
FIG. 2 is a diagram illustrating an optical system in a cold state, a hot state, and a hot steady state.

FIG. 2 is a diagram illustrating a cold state, a hot state, and a hot steady state. As used herein, a device is in a cold state when it is not being used, and at thermal equilibrium (i.e., not still cooling down from being used). For example, an excimer laser is in a cold state when it is not lasing. A device is in a hot state when it is on, and radiation propagating in the device is being absorbed by optical elements, thereby heating them. A device is in a hot steady state when it has been turned on at a constant power for long enough that the optical elements have essentially reached a thermal steady state. The thermal steady state can have some temperature jitter due to absorption of individual laser pulses, but has essentially no long-term change.

A wavefront correcting optical surface is a non-planar prism optical surface configured to adjust the wavefront of the beam. Wavefront adjustments of the beam can be desirable in order to provide a desired wavefront profile (e.g., a planar wavefront) at the output of an optical system (e.g., a laser, such as an excimer laser). Wavefront adjustments may be necessary to compensate for the fact that other optical elements in the device may not be ideal, due, for example, to manufacturing or material limitations. For example, in an excimer laser, the grating of the line narrowing module, the front reflector, and any mirrors and beam redirection or beam combination prisms may have nonideal surfaces. The wavefront correcting optical surface or surfaces of the set of prisms can be selected to correct for the nonideality of these surfaces, and provide a desired or improved wavefront profile at the output of the optical system or at a point within the optical system.

The wavefront correcting optical surfaces of the present invention are non-planar surfaces having at least about a 10 nm peak-to-valley deviation from planarity across the area of the surface that interacts with the beam. Desirably, the wavefront correcting optical surfaces have at least about a 25 nm peak-to-valley deviation from planarity across the area of the surface that interacts with the beam. The wavefront correcting optical surfaces are desirably sufficiently non-planar to adjust the relative phase of the wavefront profile, but not so highly curved that they significantly bend or refract the beam. As such, the wavefront correcting optical surfaces of the present invention have no more than about a 10 µm peak-to-valley deviation from planarity across the area of the surface that interacts with the beam. More desirably, the deviation from planarity is no more than about 3 µm peak-to-valley. In certain desirable embodiments of the invention, the deviation from planarity is no more than about 1 µm peak-to-valley.

Figure 3:
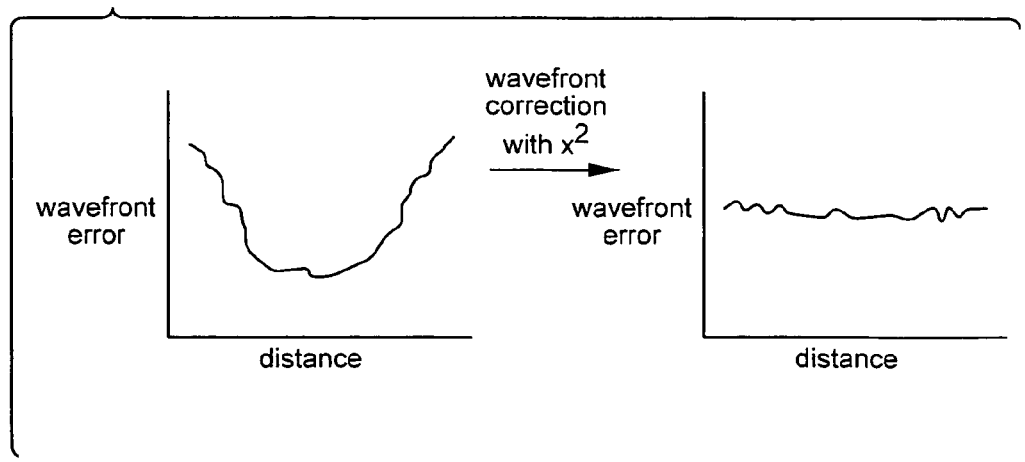
FIG. 3 is a diagram illustrating substantial wavefront correction using a wavefront correcting optical surface having an $x^2$ profile.

The skilled artisan will determine the shape of the wavefront correcting optical surface or surfaces to provide a desired or improved wavefront profile at the output of the device. The wavefront correcting optical surface can be concave, convex, or more complicated in profile. It may be desirable for the profile to have power terms such as squared terms (e.g., $x^2$), cubic terms (e.g., $x^3$), and fourth-power terms (e.g., $x^4$). When used in a line narrowing module, it may be desirable for the profile to be formed along the x axis, which is along one of the optical sides of the prisms in the dispersion direction of the grating. The skilled artisan can use conventional methods, such as non-deterministic polishing methods, to provide a wavefront correcting optical surface having a desired optical surface profile. The skilled artisan will recognize that it in many applications it may not be necessary to for the wavefront correcting optical surface to provide the ideally desired wavefront. Rather, it may be more practical to use a relatively simple wavefront correcting optical surface (e.g., having an $x^2$ or an $x^4$ profile, or a combination thereof) to remove most of the error in the wavefront, as shown in FIG. 3. It may also be desirable to provide wavefront correction in only one plane, for example in the dispersion direction of the grating of a line narrowing module. It may also be desirable to correct only for low order effects (e.g., $x^2$, $x^3$, $x^4$), and especially for low even order terms (e.g. $x^2$, $x^4$). Providing low order wavefront in only the most relevant direction may allow for less stringent manufacturing tolerances and operational stability. Desirably, the wavefront has a maximum phase difference along a plane of no greater than 500 nm peak-to-valley.

Figure 4:
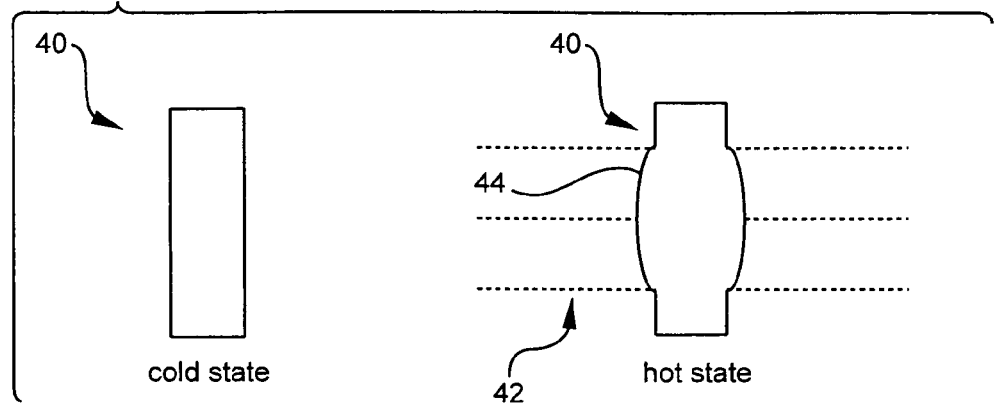
FIG. 4 is a diagram illustrating thermally-induced distortions of refractive optical elements
Figure 5:
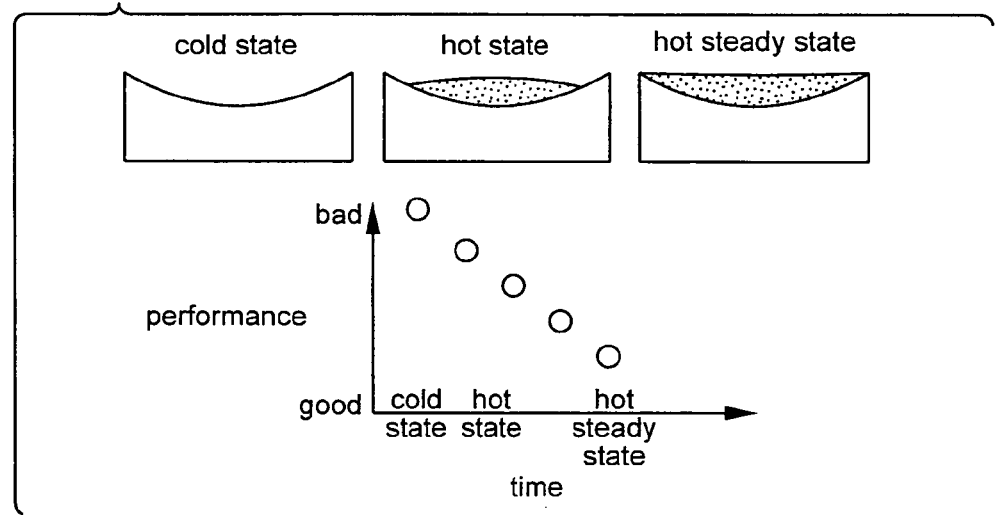
FIGS. 5 and 6 are diagrams illustrating wavefront correction of thermally-induced distortions of refractive optical elements.
Figure 6:
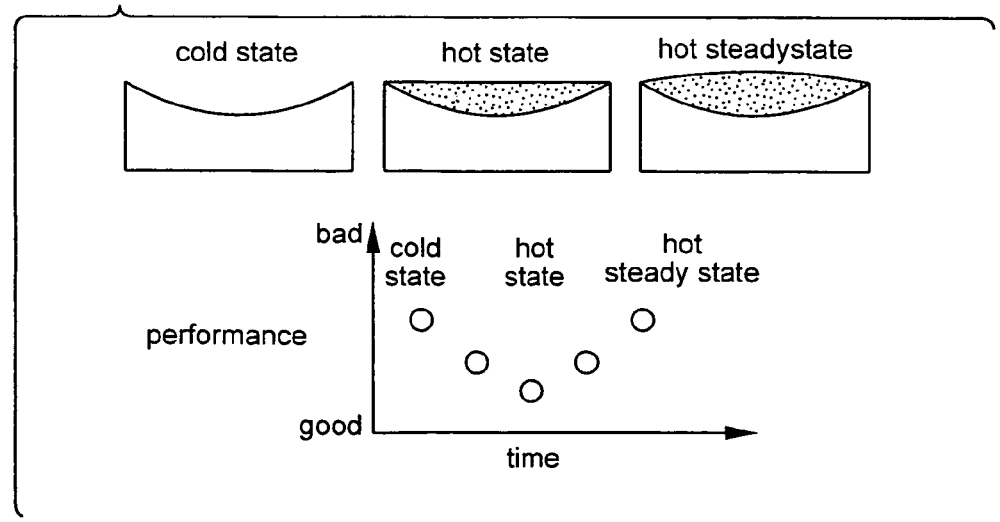

In many optical systems, absorption of radiation causes heating and thermal expansion of refractive optical elements. This expansion can cause a distortion of the surface of the refractive optical elements, as shown in FIG. 4. Prism 40 has a planar optical surface in a cold state, but in a hot state, it absorbs radiation from beam 42 and heats up and becomes convex in the beam interaction region 44, until it reaches a maximum curvature in a hot steady state. The curvature is enough to cause wavefront errors (e.g., a curved wavefront) in the beam, even though it may not be sufficient to cause significant lensing or other beam bending effects. The skilled artisan can use a wavefront correcting optical surface or surfaces to provide a desired hot state or hot steady state performance. For example, the wavefront correcting optical surface can be made to be convex in the cold state, with a profile such that when the beam expanding assembly is in a hot state, the wavefront correcting optical surface is substantially planar. It may be desirable for the wavefront correcting optical surface to have a profile such that when the beam expanding assembly is in a hot steady state, the wavefront correcting optical surface is substantially planar, as shown in FIG. 5. However, in order to give improved performance in both cold and hot steady states, it may be desirable for the wavefront correcting optical surface to be substantially planar in a hot state that is not a hot steady state, as shown in FIG. 6. In order to minimize the performance range of an optical system, it may be desirable for the wavefront correcting optical surface to be substantially planar when the system is operating in a hot steady state at about half (e.g., 40-60%) of its maximum power. The skilled artisan can use thermal and optical modeling or trial and error to determine an appropriate shape for the wavefront correcting optical surface. Every surface interacting with the beam need not be a wavefront correcting optical surface in order to get a desired hot state or hot steady state performance. Rather, less than all of the optical surfaces can be wavefront correcting optical surfaces adapted to account for expansion of more than one optical surface.

Figure 7:
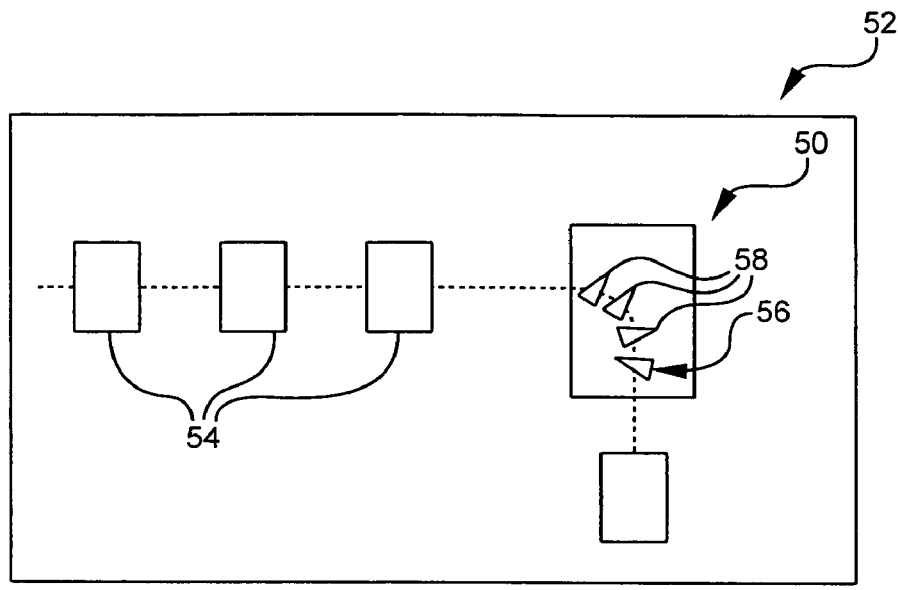
FIG. 7 is a schematic view of an optical system according to one embodiment of the present invention.

In one embodiment of the invention, shown in FIG. 7, the prism beam assembly 50 is part of an optical system 52. Optical system 52 has static wavefront errors, caused by imperfections in the optical components 54 of the system as made (i.e., in a cold state), and dynamic wavefront errors, caused by the hot state distortion of the optical components 54 from their as-made geometries. In the embodiment of the invention of FIG. 7, the set of prisms of the prism beam assembly 50 has a first subset 56 of prisms having at least one first wavefront correcting optical surface configured to correct the static wavefront errors of the system, and a second subset 58 of prisms having at least one second wavefront correcting optical surface configured to correct the dynamic wavefront errors of the system.

The prisms used in the present invention can be formed from any suitable optical material. In desirable embodiments of the present invention (e.g., for use in excimer laser systems), the prisms are made from high purity fused silica, calcium fluoride, or magnesium fluoride. The present invention is especially useful for use with prism materials having a room temperature CTE greater than about 5 ppm/K, such as calcium fluoride. The present invention is also especially useful with prisms that have functional coatings (such as anti-reflection coatings), since the coatings themselves can absorb energy, heat up and cause prism surface distortions.

Figure 8:
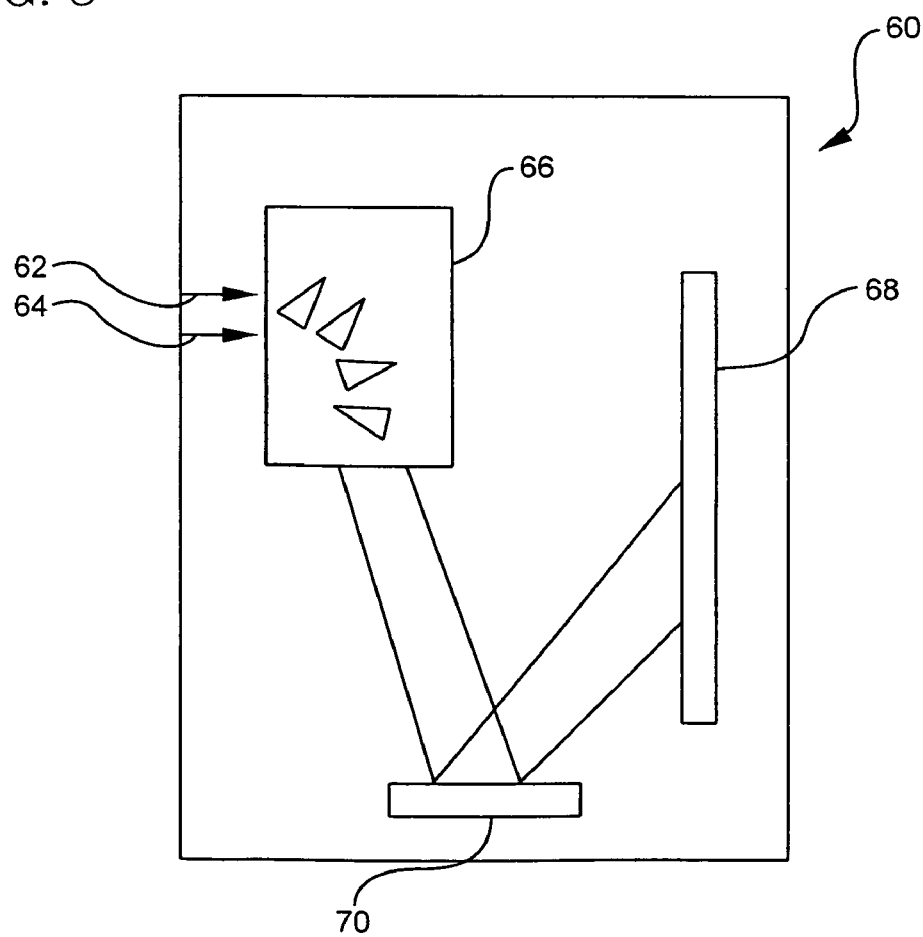
FIG. 8 is a schematic view of a line narrowing module according to one embodiment of the present invention.

Another embodiment of the invention is shown in FIG. 8. A line narrowing module 60 for a laser has an input 62, and output 64. In the embodiment of FIG. 8, the input and output are coincident. The line narrowing module 60 includes a beam expanding assembly 66 as described above, and a reflective wavelength selective element 68, such as a grating or an etalon. The embodiment of FIG. 8 also includes a folding mirror 70. A beam of radiation entering the line narrowing module at its input is expanded by the beam expanding assembly 66 and reflected by folding mirror 70, then interacts with reflective wavelength selective element 68. In the embodiment of FIG. 8, the reflective wavelength selective element 68 is a diffraction grating operating under Littrow conditions, so that a desired laser wavelength is retroreflected along the beam path, such that a beam having a narrow linewidth exits the line narrowing module 60 at the output. The wavefront correcting optical surface or surfaces of the beam expanding assembly of the line narrowing module can be configured to correct wavefront errors due to imperfections in the folding mirror and the reflective wavelength selective element, but can also correct wavefront imperfections coming from other optical elements of the laser into which it is installed. By correcting wavefront errors using wavefront correcting optical surfaces of the prisms of the beam expanding assembly, the skilled artisan can avoid the use of other wavefront correction techniques. As such, in desirable embodiments of the invention, line narrowing module 60 does not include a reflective optical element having a wavefront correction surface, a bendable grating, or an adaptive optic.

One major source of wavefront error in line narrowing modules is the reflective diffraction grating commonly used as the reflective wavelength selective element. The skilled artisan can remove much of the wavefront error in the device as a whole by compensating for the wavefront error caused by the grating. As such, in one embodiment of the present invention, the wavefront correcting optical surface is adapted to substantially cancel the wavefront error of the reflective wavelength selective element. The skilled artisan can perform a separate measurement on the reflective wavelength selective element to determine its wavefront error, and form the wavefront correcting optical surface appropriately. For use with many reflective wavelength selective elements, it may be desirable for the wavefront correcting optical surface to be curved about an axis that is substantially perpendicular to the dispersion plane of the reflective wavelength selective element. In many cases, it may be sufficient for the wavefront correcting optical surface to be curved only about an axis that is substantially perpendicular to the dispersion plane of the reflective wavelength selective element. In FIG. 8, the dispersion plane of the reflective wavelength selective element is the plane of the page.

Figure 9:
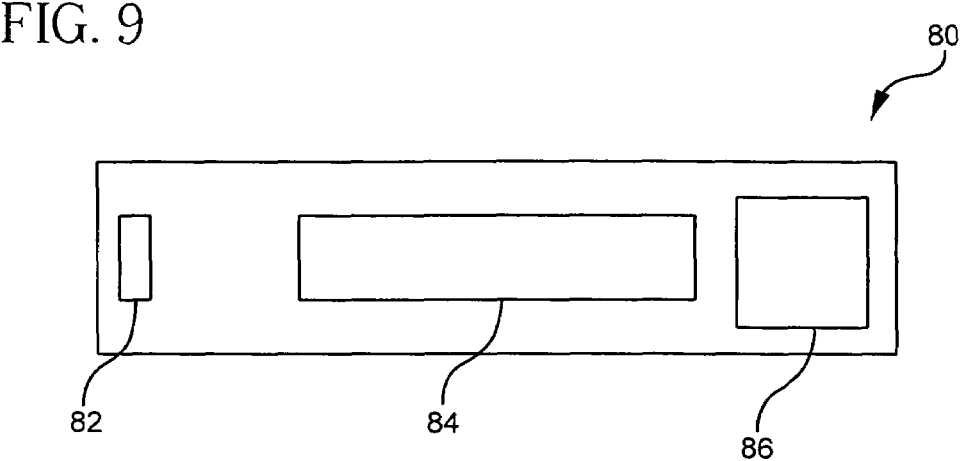
FIG. 9 is a schematic view of a laser according to one embodiment of the present invention.

Another embodiment of the invention is shown in schematic view in FIG. 9. A laser 80 includes a front partial reflector 82 and a line narrowing module 86 as described above. The laser also includes a laser gain module 84, which is disposed operatively between the partial front reflector 82 and the line narrowing module 86. The laser gain module can include any desired gain medium along with and energizing apparatus to pump energy into the gain medium (e.g., a pair of electrodes). In desirable embodiments of the invention the laser is high power (e.g.,>1 W output, or greater than 10 W output) laser operating at a UV wavelength (e.g., below 300 nm, or below 200 nm). For example, the laser can be a KrF excimer laser, an ArF excimer laser, or an $F_2$ laser. Desirable laser systems for use in the present invention are described in U.S. Pat. Nos. 5,559,816; 5,970,082; 6,404,796; 6,424,666; 6,493,374; and 6,671,294, each of which is incorporated herein by reference in its entirety.

The skilled artisan can use the wavefront correcting optical surfaces of the laser of FIG. 9 to yield a laser output having a desired wavefront profile. For example, the wavefront correcting optical surfaces can be selected such that a beam output from the laser has a substantially planar output. In one desirable embodiment of the invention, the wavefront correcting optical surfaces are selected as described above to account for absorption-induced distortions of the optical elements of the laser, such that when the laser is in a hot state, a beam output from the laser has a substantially planar wavefront. In certain desirable embodiments of the invention, the wavefront correcting optical surfaces are selected such that when the laser is in a hot steady state, a beam output from the laser has a substantially planar wavefront. For example, the beam output from the laser is desirably less than 500 nm peak-to-valley over the central 0.1 pm wavelength window of the beam.

The quality of the wavefront within the laser cavity has an effect on the linewidth of the laser. The skilled artisan can select wavefront correcting optical surfaces such that a laser having an output power of at least 1 W has an E95 linewidth of 1 pm or less, and a FWHM linewidth of 0.5 pm or less. Desirably, the laser has an output power of at least 3 W. In especially desirable embodiments of the invention, the laser has an output power of 10 W. Desirably, the laser has an E95 linewidth of about 0.7 pm or less. Desirably, the laser has a FWHM linewidth of about 0.3 pm or less.

The skilled artisan will note that the wavefront correcting optical surfaces of the present invention can be sufficient to correct any wavefront errors within the laser or at the output. As such, the laser according to one embodiment of the present invention does not include a reflective optical element having a wavefront correction surface, a bendable grating, or an adaptive optic.

Figure 10:
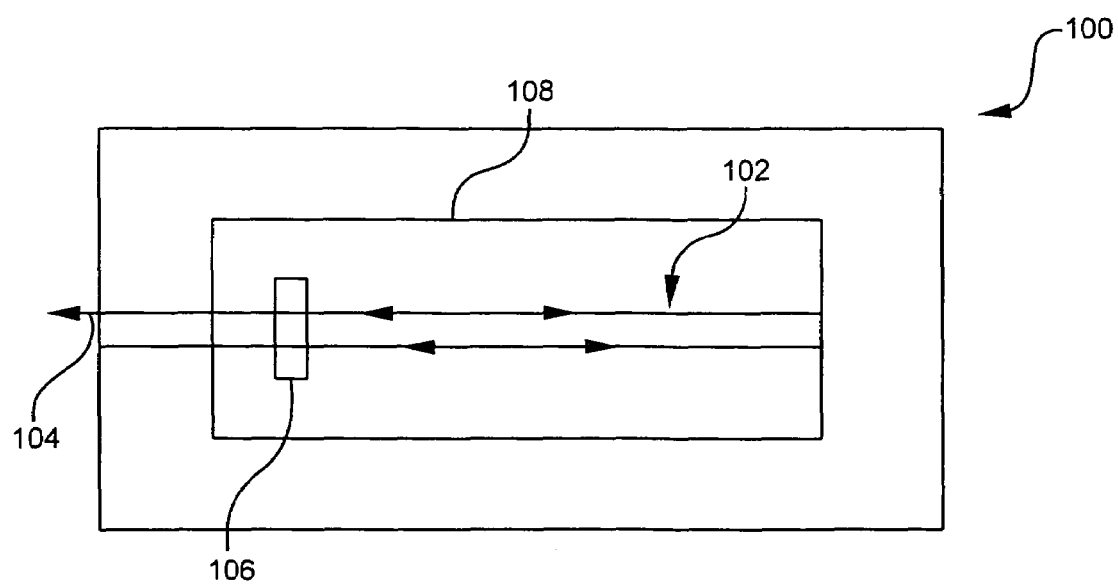
FIG. 10 is a schematic view of a laser according to another embodiment of the present invention.

As the skilled artisan will appreciate, the wavefront correcting optical surface or surfaces of a laser need not be disposed on a prism of a beam expanding assembly. As such, another embodiment of the present invention, shown in schematic view in FIG. 10, is a laser 100 having an internal beam path 102 and an laser beam output 104. Laser 100 comprises a resonator 108 and at least one refractive optical element 106 disposed in the laser beam path. The refractive optical element has a wavefront correcting optical surface. The refractive optical element may be a prism of a beam expanding assembly, or may be any other refractive optical element in the laser, such as a delay loop prism, a beam expanding prism, a beam redirection prism, a window, a lens, or a prism at the output of a high power laser system. The wavefront correcting optical surface may, as described above, be selected to correct static and/or dynamic wavefront errors in the device, and different sets of wavefront correcting optical surfaces may be adapted to correct different types of error. The wavefront correcting optical surface can be a concave surface in the cold state, and becomes less concave as the laser heats from the cold state. The wavefront correcting optical surface can have a profile that has $x^2$ terms, $x^4$ terms, or both, and may only have $x^2$ and/or $x^4$ terms. The refractive optical element can be made, for example, from $CaF_2$ or $MgF_2$, and can have a functional coating, such as an antireflection coating formed thereon. The lasers of the present invention desirably do not include a reflective optical element having a wavefront correction surface, a bendable grating, or an adaptive optic.

As described above, the skilled artisan can adapt the wavefront correcting optical surface to give a desired laser output. For example, according to one embodiment of the invention, when the laser is in a hot state, a beam exiting the laser from the laser beam output has a substantially planar wavefront. In certain desirable embodiments of the invention, the wavefront correcting optical surface is selected such that when the laser is in a hot steady state, a beam exiting the laser from the laser beam output has a substantially planar wavefront. As described above, the skilled artisan can adapt the wavefront correcting optical surface to provide a laser output with a desirably narrow linewidth. For example, in desirable embodiments of the invention, a beam exiting the laser from the laser beam output has a power of at least 1 W, an E95 linewidth of about 1 pm or less, and a FWHM linewidth of 0.5 pm or less. Desirably, the laser has an output power of at least 3 W. In especially desirable embodiments of the invention, the laser has an output power of 10 W. Desirably, the laser has an E95 linewidth of about 0.7 pm or less. Desirably, the laser has a FWHM linewidth of about 0.3 pm or less.

The skilled artisan will realize that the use of wavefront correcting optical surfaces can be advantageous in optical systems other than beam expanding assemblies, line narrowing modules, and lasers. Another embodiment of the present invention, shown in FIG. 10, relates to an optical system 120, having a source of radiation 121, a beam path 122, an output 123, and a set of one or more refractive optical elements 124 disposed in the beam path, the set including at least one wavefront correcting optical surface, the set of refractive optical elements being selected to give the radiation a substantially planar wavefront at a location along the beam path. It may be desirable for the set of refractive optical elements to be selected to give the radiation a substantially planar wavefront at the output of the optical system. The optical system of according to the embodiment of FIG. 10 can be a beam expanding assembly, a line narrowing module, or a laser as described above, or can be another optical system such as a lens system or a detection apparatus. The wavefront correcting optical surfaces of this embodiment of the invention can be employed in the manner described above with respect to the laser, line narrowing module, and beam expanding assembly embodiments of the invention.

The wavefront correcting optical surfaces of the present invention are disposed on refractive optical elements such as prisms and windows. The use of wavefront correcting optical surfaces in optical systems can be desirable when a refractive optical element is subjected to UV radiation (e.g.<300 nm, or<200 nm in wavelength) having a fluence of at least about 1 $W/cm^2$, and is especially desirable when the fluence is at least about 10 $W/cm^2$. Because distortion is linked to thermal expansion, which is in turn governed by absorbance and thermal properties of the refractive optical element, the use of wavefront correcting optical surfaces can be especially advantageous when the beam path has a path length within a refractive optical element of at least about 10 mm.

The present invention also provides methods for making optical systems including wavefront correcting optical surfaces. For example, according to one embodiment of the invention, a method of making an optical system includes the steps of selecting a plurality of optical elements for the optical system; selecting a configuration for the optical system; determining the performance of the optical system comprising the selected optical elements in the selected configuration; ensuring that at least one of the optical elements has a wavefront correcting optical surface adapted to improve the performance of the optical system; and assembling the optical elements into the optical system having the selected configuration. The wavefront correcting optical surface can be adapted, for example, to provide a planar wavefront at the output of the system.

The skilled artisan will appreciate that these steps may be performed in a variety of ways, and need not be performed in the recited order. For example, in one method according to the present invention, the skilled artisan can select the optical elements and the configuration, and use optical modeling to determine the performance of the system, including any wavefront error. The optical modeling desirably takes into account any imperfections in the optical elements. The skilled artisan can then form a wavefront correcting optical surface on one of the optical elements, or add an optical element (e.g., a window) having a wavefront correcting optical surface, then physically assemble the optical elements into the optical system.

In another method of the present invention, the step of determining the performance of the optical system is performed by focusing on less than all of the optical elements. For example, in certain of the line narrowing module embodiments described above, the determination of the performance of the optical system is performed by determining the wavefront error caused by the diffraction grating alone, and the wavefront correcting optical surface is adapted to correct that error alone. In other embodiments of the invention, only the optical element or elements known to cause the most wavefront error can be considered in the determination of performance.

The skilled artisan may alternatively use an actual test of the optical system to determine its performance. For example, the selected optical elements can be assembled in the selected configuration, then the optical system can be tested. Upon quantifying the wavefront error of the system, the skilled artisan can form a wavefront correcting optical surface on one of the optical elements, or add an optical element (e.g., a window) having a wavefront correcting optical surface to the optical system. This process can be performed iteratively in order to give an desired improvement in the system performance.

The methods of the present invention can be used by the skilled artisan to make a laser. For example, the skilled artisan can select a front partial reflector, a laser gain module, and a line narrowing module, and a configuration for the laser, and forming the wavefront correcting optical surface on some refractive optical element within the laser. The wavefront correcting optical surface can be formed on a refractive optical element of the front partial reflector, the laser gain module, or the line narrowing module, or can be formed on some other refractive optical element. The wavefront correcting optical surface can be adapted such that a beam exiting the laser beam output has a substantially planar wavefront. The wavefront correcting optical surface can also be adapted such that when the laser apparatus is in a hot state (e.g., a hot steady state), a beam exiting the laser beam output has a power of at least 1 W, an E95 linewidth of 1 pm or less, and a FWHM linewidth of 0.5 pm or less.

The methods of the present invention can also be used by the skilled artisan to make a line narrowing module. For example, the plurality of optical elements can include a beam expanding assembly and a reflective wavelength selective element, and optionally a folding mirror, and a configuration for the line narrowing module, and ensuring that the wavefront correcting optical surface is formed on a refractive optical element within the line narrowing module. The wavefront correcting optical surface can be formed on a refractive optical element of the beam expanding assembly, or can be formed on some other refractive optical element. The wavefront correcting optical element can be adapted to substantially cancel the wavefront error of the grating (an example of a static wavefront error), and can also be adapted to substantially cancel the dynamic wavefront errors due to thermal expansion of the refractive optical elements (e.g., the prisms of the beam expanding assembly) during use.

In certain embodiments of the invention, the skilled artisan may desire to use wavefront correcting optical surfaces on the prisms of a beam expanding assembly in order to reduce both static and dynamic errors in an optical system. In such a case, it may be desirable to form a wavefront correcting optical surface adapted to correct static wavefront errors of the optical system on the last prism of the assembly (i.e., where the beam is most expanded). The skilled artisan can determine the prism for which the fluence of the beam is highest; it may be desirable to form a wavefront correcting optical surface on this prism to correct dynamic wavefront errors.

According to another embodiment of the invention, the skilled artisan can use set selection of optical elements when making a laser in order to provide a desired laser output. The skilled artisan will recognize that it is not necessary to form wavefront correcting optical surfaces specially in response to a determination of a wavefront error of the optical system. Rather, the skilled artisan can set-select premade refractive optical. elements having known surface profiles to provide wavefront correction. As such, according to one embodiment of the present invention, the step of ensuring that at least one of the optical elements is a refractive optical element having a wavefront correcting optical surface adapted to improve the performance of the optical system includes the step of set-selecting premade refractive optical elements to provide a desired net wavefront correction.

It will be apparent to those skilled in the art that various modifications and variations can be made to the present invention without departing from the spirit and scope of the invention. For example, the skilled artisan may add other cationic or anionic species to the materials of the present invention. While the electro-optic ceramic materials of the present invention have been described with reference to use at telecommunications wavelengths, the skilled artisan will recognize that they may be used in other wavelength regimes. Thus, it is intended that the present invention cover the modifications and variations of this invention provided they come within the scope of the appended claims and their equivalents.

What is claimed is:

1. A beam expanding assembly for expanding a beam, the beam expanding assembly having an input, an output and a beam path, the beam expanding assembly comprising
    a set of one or more prisms configured to expand the beam propagating from the input along the beam path to the output,
    wherein at least one of the one or more prisms has a wavefront correcting optical surface that changes in shape in response to transmission of the beam through the one or more prisms from an initial non-planar form into a second steady-state form that compensates for thermally induced wavefront errors of the beam.

2. The beam expanding assembly of claim 1, wherein the wavefront correcting optical surface is a concave surface in the initial non-planar form.

3. The beam expanding assembly of claim 1, wherein, the wavefront correcting optical surface is substantially planar in the steady-state form.

4. The beam expanding assembly of claim 1, wherein the one or more prisms are made from $CaF_2$ or $MgF_2$.

5. The beam expanding assembly of claim 1, wherein the beam expanding assembly is part of an optical system, and wherein a first subset of the set of prisms is configured to correct static wavefront errors in the optical system, and a second subset of the prisms is configured with the wavefront correcting optical surface that changes in shape in response to transmission of the beam through the second subset of prisms from the initial non-planar form into the second steady-state form to correct dynamic wavefront errors in the optical system, and wherein beam fluence is higher in the second subset of prisms that in the first subset of prisms.

6. A line narrowing module for a laser apparatus, the line narrowing module having an input, an output and a beam path, the line narrowing module comprising a reflective wavelength selective element, and the beam expanding assembly of claim 1.

7. The line narrowing module of claim 6, wherein the wavefront correcting optical surface substantially cancels the wavefront error of the reflective wavelength selective element.

* * * * *